(12) United States Patent
Takahashi et al.

(10) Patent No.: US 12,427,842 B2
(45) Date of Patent: Sep. 30, 2025

(54) DEFLECTOR DEVICE FOR VEHICLE SUNROOF

(71) Applicant: YACHIYO INDUSTRY CO., LTD., Sayama (JP)

(72) Inventors: Yuya Takahashi, Tochigi (JP); Moto Kikuchi, Tochigi (JP)

(73) Assignee: YACHIYO INDUSTRY CO., LTD., Sayama (JP)

(*) Notice: Subject to any disclaimer, the term of this patent is extended or adjusted under 35 U.S.C. 154(b) by 0 days.

(21) Appl. No.: 18/998,229

(22) PCT Filed: Jun. 2, 2023

(86) PCT No.: PCT/JP2023/020671
§ 371 (c)(1),
(2) Date: Jan. 24, 2025

(87) PCT Pub. No.: WO2024/024279
PCT Pub. Date: Feb. 1, 2024

(65) Prior Publication Data
US 2025/0256555 A1    Aug. 14, 2025

(30) Foreign Application Priority Data
Jul. 27, 2022 (JP) .................................. 2022-119353

(51) Int. Cl.
*B60J 7/22* (2006.01)
(52) U.S. Cl.
CPC ...................................... *B60J 7/22* (2013.01)
(58) Field of Classification Search
CPC ................................... B60J 7/22; B60J 7/223
USPC ................................. 296/217; 160/369, 403
See application file for complete search history.

(56) References Cited

U.S. PATENT DOCUMENTS 11,358,455 B2    6/2022    Shibue et al.

FOREIGN PATENT DOCUMENTS

| CN | 210234629 U | 4/2020 |
|----|-------------|--------|
| CN | 212796498 | 3/2021 |
| DE | 102006043275 | 1/2008 |
| JP | 2020006888 A | 1/2020 |

OTHER PUBLICATIONS

CN205930181 Text (Year: 2017).*
DE102009041291 Text (Year: 2013).*
(Continued)

*Primary Examiner* — Dennis H Pedder
(74) *Attorney, Agent, or Firm* — Dority & Manning, P.A.

(57) ABSTRACT

The deflector device includes a deflector main body that can be folded and deployed, a retained member provided along an upper edge of the deflector main body, a deflector blade provided with a groove extending in a vehicle width direction to receive the retained member therein, and a retaining member that is fixed to the deflector blade to retain the retained member in the groove. The retaining member includes an engaging part having one end that engages the retained member in the groove, and a fixing part extending from another end of the engaging part at an angle to the engaging part and provided with a plurality of insertion holes for a fastening member secured to the deflector blade.

6 Claims, 8 Drawing Sheets

(56) References Cited

OTHER PUBLICATIONS

PCT International Search Report (w/ English translation) for corresponding PCT Application No. PCT/JP2023/020671, mailed Aug. 15, 2023, 5 pages.
Written Opinion of the International Searching Authority for corresponding PCT Application No. PCT/JP2023/020671, mailed Aug. 15, 2023, 3 pages.
Written Opinion of the International Searching Authority (w/ English translation) for corresponding PCT Application No. PCT/JP2023/020671, mailed Aug. 15, 2023, 6 pages.
Office Action (with English translation) received in corresponding Application No. CN 202380056024.6, dated May 18, 2025, 13 pages.

* cited by examiner

DEFLECTOR DEVICE FOR VEHICLE SUNROOF

CROSS-REFERENCE TO RELATED APPLICATIONS

This application is the U.S. National Stage entry of International Application No. PCT/JP2023/020671, filed on Jun. 2, 2023, which, in turn, claims priority to Japanese Patent Application No. 2022-119353, filed on Jul. 27, 2022, both of which are hereby incorporated herein by reference in their entireties for all purposes.

TECHNICAL FIELD

The present invention relates to a deflector device for a vehicle sunroof.

BACKGROUND ART

A vehicle sunroof that includes a movable sunroof panel fitted to the fixed roof of the vehicle may be additionally provided with a deflector device configured to deploy a deflector extending along the front edge of an opening of the fixed roof upward from the opening when the opening of the fixed roof is opened by sliding the moveable roof panel away from the opening.

A known deflector device of this type comprises a deployable deflector element made of flexible sheet material, which is connected to a rigid deflector base element mounted to the roof and a deployment bracket (deflector blade) which is pivotable (Patent Document 1). In this deflector device, a groove is formed in each of the deflector base element and the deployment bracket, and a keder (welt/piping) connected to each end of the deflector element (deflector main body) is fitted into the corresponding groove. The keder can be injection molded on the deflector main body and is made of elastically deformable plastic member. Each keder is retained in the corresponding groove by the heads of crew members that are threaded into the deflector base element or the deflector blade.

PRIOR ART DOCUMENT(S)

Patent Document(s)

Patent Document 1: DE102006043275B3

SUMMARY OF THE INVENTION

Task to be Accomplished by the Invention

However, in the deflector device disclosed in Patent Document 1, since the keder (or the member to be retained) is retained in the groove by the heads of the screw members, it is possible that the keder may be dislodged from the groove when the screw members are loosened and the retaining action of the heads is thereby impaired. Furthermore, since the tension on the deflector main body is concentrated on the parts of the keder where the heads of the screw members contact the deflector main body, there is a risk that the keder may bend so that the tension may fail to be applied uniformly to the deflector main body.

In view of the such a problem of the prior art, a primary object of the present invention to prevent detachment of the deflector main body from the deflector blade and slackening of the deflector main body.

Means to Accomplish the Task

In order to accomplish such a task, an aspect of the present invention provides a deflector device (10) for a vehicle sunroof, comprising: a deflector main body (11) made of cloth-like material so as to be folded and deployed and positioned along a front edge of an opening (2) formed in a fixed roof (3); a retained member (21) provided along an upper edge of the deflector main body; a deflector blade (14) provided with a groove (22) extending in a vehicle width direction to receive the retained member therein; a pair of arms (16) that support either lateral end of the deflector blade to allow the deflector blade to protrude and retract from and into the opening; and a retaining member (23) that is fixed to the deflector blade to retain the retained member in the groove, wherein the retaining member includes an engaging part (24) having one end (24a) that engages the retained member in the groove, and a fixing part (25) extending from another end (24b) of the engaging part at an angle to the engaging part and provided with a plurality of insertion holes (26) for a fastening member (27) secured to the deflector blade.

According to this aspect, since the retaining member is fixed to the deflector blade by the fastening members inserted into the insertion holes, the retaining member is unlikely to be detached from the deflector blade. Further, since the retaining member includes the engaging part and the fixing part inclined or at an angle with respect to the engaging part, the retaining member is resistant to bending. This prevents the deflector main body from slackening.

In the above aspect, preferably, the retained member (21) is received in the groove in a folded back state at the bottom of the groove (22) so as to interpose the engaging part (24).

According to this aspect, even if the retained member is not bonded or otherwise fixed to the engaging part, the engaging part is unlikely to be detached. Therefore, the retained member is prevented from being dislodged from the groove of the deflector blade.

In the above aspect, preferably, parts (31, 32) of the retained member (21) that interpose the engaging part (24) are each provided with a protrusion (35, 34) protruding toward the engaging part.

According to this aspect, the two parts of the retained member interposing the engaging part therebetween can be brought into contact with the engaging part over a long region extending in the vehicle width direction. This prevents any part of the deflector main body from slackening due to displacement of the retained member with respect to the engaging part.

In the above aspect, preferably, the fixing part (25) extends in the vehicle width direction over a length corresponding to a length of the engaging part (24) in the vehicle width direction, and the retaining member (23) has an L-shape in a cross section orthogonal to the vehicle width direction.

According to this aspect, the bending rigidity of the retaining member is improved over the entire length thereof in the vehicle width direction. As a result, the retaining member is made resistant to bending, and slackening of the deflector main body is prevented.

In the above aspect, preferably, the deflector blade (14) is provided with a projection (46) adjacent to a part thereof to which the fastening member (27) is attached, and the fixing part is provided with a positioning hole (44) which engages the projection.

According to this aspect, the retaining member is correctly positioned with respect to the deflector blade by the engagement of the projection with the positioning hole. This facilitates the assembly work of attaching the fastening member to the deflector blade.

In the above aspect, preferably, the deflector blade (14) is formed integrally with the arms so as to be continuous with the arms via a pair of curved parts (15) thereof, and the retaining member includes a central member (41) positioned at a center in the vehicle width direction and a pair of curved members (42) positioned on the curved parts, respectively, and each curved member is configured to retain a corresponding end of the retained member (21) in a part of the groove (22) formed in the corresponding arm (16).

According to this aspect, even if there is a manufacturing error, the end of the retained member can be inserted into the groove formed in the curved part and the arms by the curved members without being affected by the positional error due to the manufacturing error. This prevents slackening of the end part of the deflector main body.

Effect of the Invention

According to the above aspect, it is possible to prevent detachment of the deflector main body from the deflector blade and slackening of the deflector main body.

DETAILED DESCRIPTION OF THE PREFERRED EMBODIMENT(S)

An embodiment of the present invention will be described in the following in detail with reference to the appended drawings. In the following description, the longitudinal direction and the lateral direction (vehicle width direction) are defined based on the traveling direction of the vehicle to which the present invention is applied.

Figure 1:
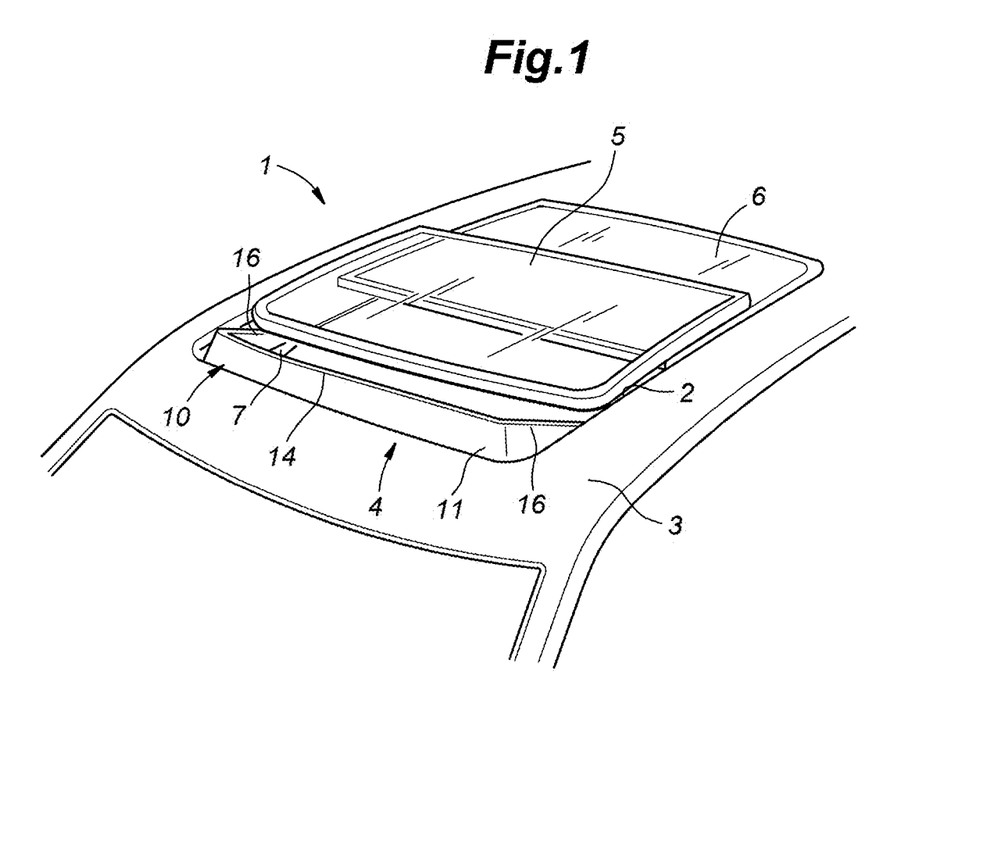
FIG. 1 A perspective view of a vehicle roof to which a deflector device according to an embodiment of the present invention is applied FIG. 2 A perspective view of the deflector device FIG. 3 A sectional view of the deflector device FIG. 4 An enlarged view of an essential part of FIG. 3

FIG. 1 is a perspective view of a roof 1 of an automobile to which a deflector device 10 of the present embodiment is applied. As shown in FIG. 1, the roof 1 includes a fixed roof 3 having a generally rectangular opening 2 formed in a front part thereof, and a sunroof device 4 provided so as to selectively close this opening 2: the roof 1 is thus formed as a sunroof. The sunroof device 4 includes a front panel 5 that closes a front part of the opening 2 and a rear panel 6 that closes a rear part of the opening 2. The front panel 5 and the rear panel 6 are arranged along the roof 1 such that their upper surfaces are flush with the general upper surface of the roof 1. The front panel 5 is a movable panel that is movable relative to the roof 1, and the rear panel 6 is a fixed panel that is immovable relative to the roof 1. The front panel 5 is provided so as to be slidable in the fore and aft direction with respect to the fixed roof 3. The front panel 5 opens the front part of the opening 2 by sliding rearward, and closes the front part of the opening 2 by sliding forward.

The front panel 5 and the rear panel 6 are supported by a sunroof frame 7 that is positioned under the fixed roof 3 (on the vehicle interior side). The sunroof frame 7 has a frame structure that includes a pair of side members, a front member 8 (see FIG. 3), and a rear cross member. The side members extend in the fore and aft direction along either side edge of the opening 2. The side members are made of extruded aluminum alloy, for example. The front member 8 extends laterally along the front edge of the opening 2 and connects the front ends of the side members to each other. The rear cross member extends laterally along the rear edge of the opening 2 and connects the rear ends of the side members to each other. The front member 8 and the rear cross member are made of injection molded plastic material, for example.

The sunroof device 4 is of an outer slide type in which the front panel 5, initially in a closed position where the front part of the opening 2 is closed, is tilted up from the closed position, and is then slid backward over the rear panel 6. The front panel 5 is driven by a per se known drive mechanism that performs the tilting and sliding operations of the front panel 5 by sliding a front slider and a rear slider in the fore and aft direction along guide rails formed on the side members. Detailed description of the drive mechanism will be omitted here.

A deflector device 10 is provided at the front edge of the opening 2. The deflector device 10 projects upward from the opening 2 when the opening 2 is open, and is retracted below the opening 2 when the opening 2 is closed. The deflector device 10 is mounted to the sunroof frame 7 and forms a part of the sunroof device 4. The sunroof device 4 is configured as a unit which is mounted to the roof 1 when the sunroof frame 7 is fixed to the fixed roof 3.

Figure 2:
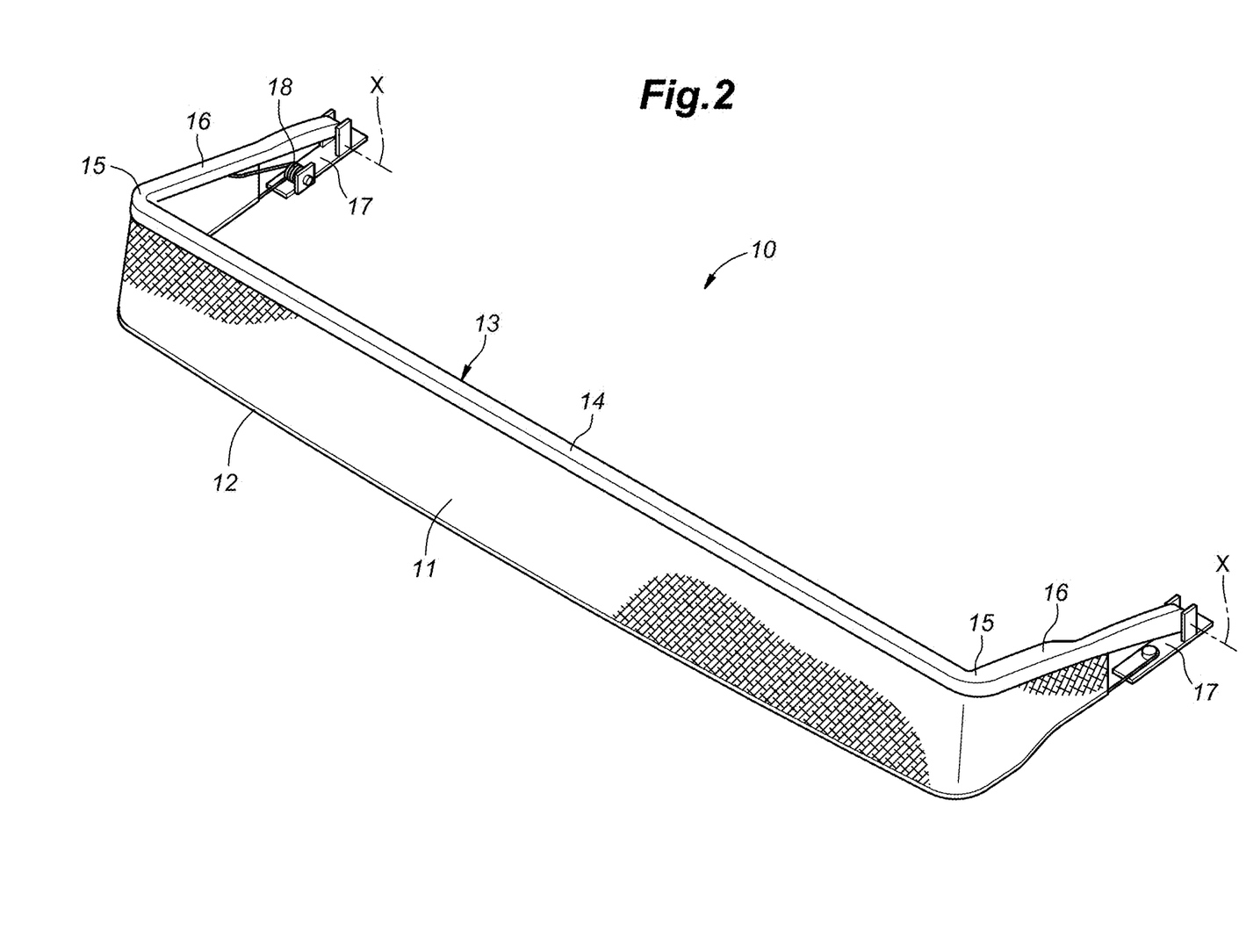
Figure 3:
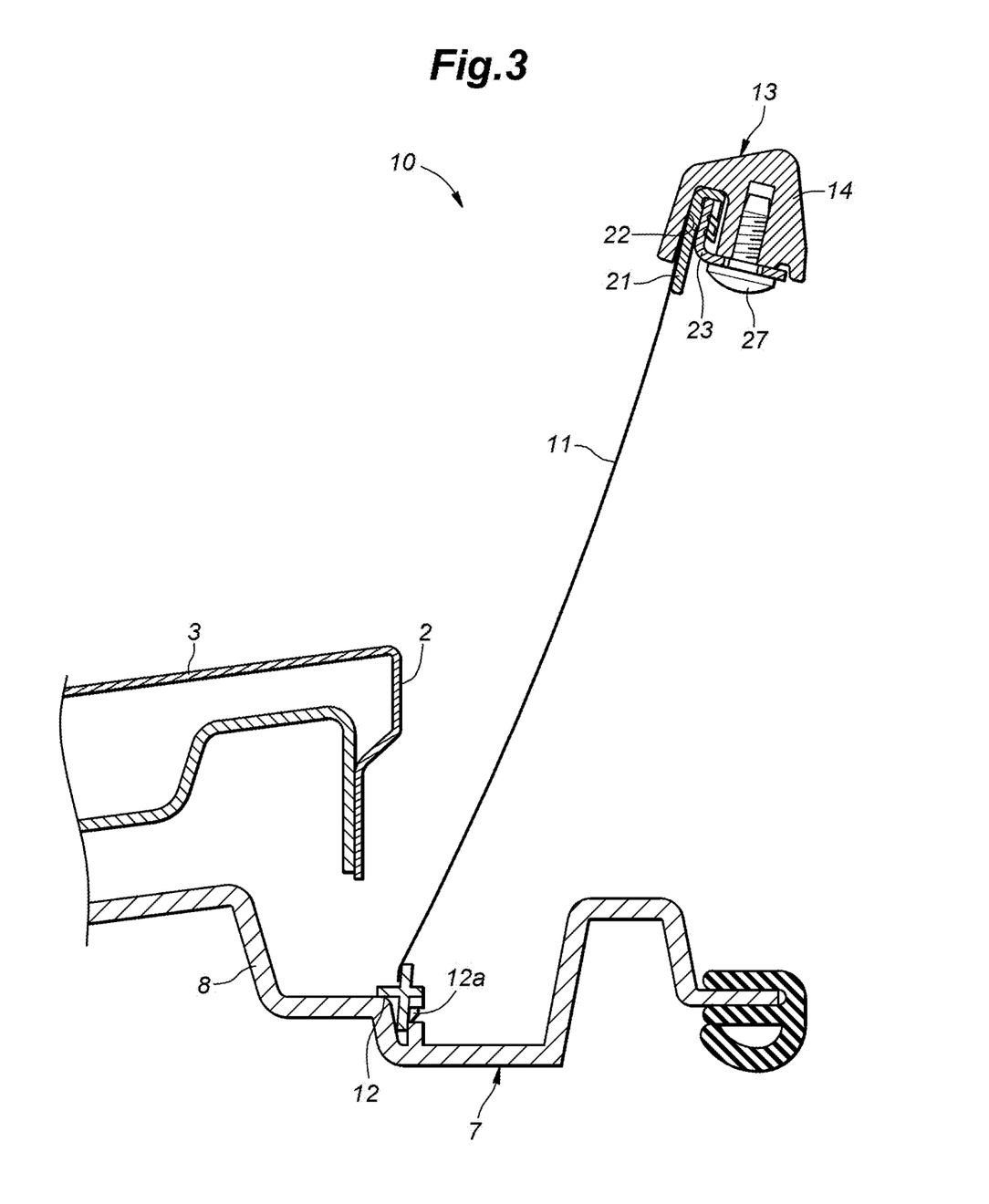

FIG. 2 is a perspective view of the deflector device 10. The deflector device 10 has a generally laterally symmetrical configuration. The deflector device 10 is positioned along the front edge of the opening 2 and is provided with a deflector main body 11 which is made of cloth that can be folded and deployed. The deflector main body 11 may be made of a fine mesh material made of a flexible cloth. The lower edge of the deflector main body 11 is attached to the front member 8 (FIG. 3) of the sunroof frame 7 via a lower holder 12 (FIG. 3). An upper holder 13 is attached to the upper edge of the deflector main body 11.

The upper holder 13 is an injection molded plastic product, and is integrally formed with a deflector blade 14 extending in the lateral direction and a pair of arms 16 extending rearward from a pair of curved parts 15 formed at either side end of the deflector blade 14. The arms 16 are supported at their rear ends by a pair of support members 17 attached to the sunroof frame 7, respectively, so as to be pivotable about an axis X extending in the lateral direction. A pair of biasing members 18 (only the right biasing member 18 is shown in FIG. 2) are provided between the upper holder 13 and the sunroof frame 7 to urge the arms 16 upward. In the illustrated example, the biasing members 18 each consist of a torsion coil spring. In other embodiments, the biasing members 18 may consist of other types of springs such as leaf springs, compression coil springs, and tension coil springs. The arms 16 cause the deflector blade 14 to protrude from the opening 2 when the front panel 5 is slid rearward, and to retract into the opening 2 when the front panel 5 is slid forward.

FIG. 3 is a cross-sectional view of the deflector device 10 in the deployed state. As shown in FIGS. 2 and 3, the lower holder 12 is attached to the lower edge of the deflector main body 11 by, for example, adhesive. The lower holder 12 is, for example, an injection molded plastic product, and has claws 12a that engage with the front member 8 of the sunroof frame 7 so that the lower holder 12 is detachably attached to the front member 8. By attaching the lower holder 12 to the front member 8, the lower edge of the deflector main body 11 is fixed to the front member 8.

Figure 4:
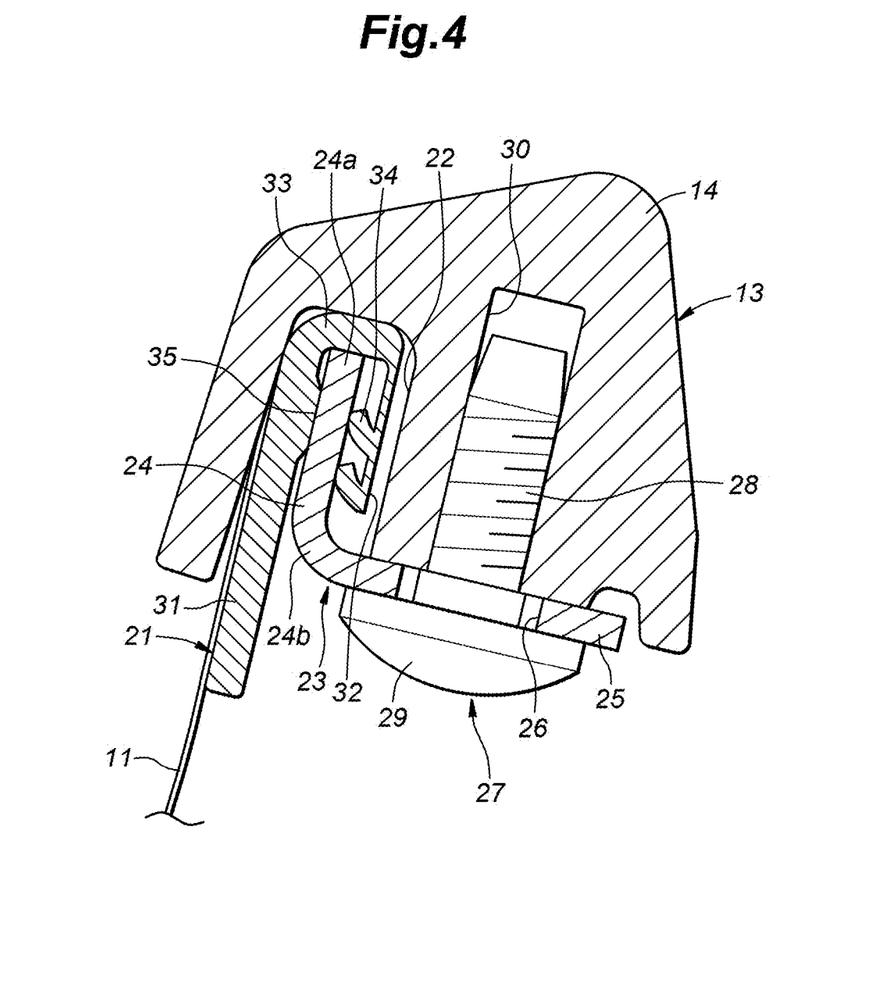

A retained member 21 is attached to the upper edge of the deflector main body 11 by stitching. The retained member 21 may also be attached to the deflector main body 11 by adhesion or welding. The upper edge of the deflector main body 11 is held by the deflector blade 14 via the retained member 21. FIG. 4 is an enlarged view of the main part in FIG. 3. As shown in FIGS. 3 and 4, a groove 22 extending in the vehicle width direction is formed on the lower surface of the deflector blade 14. As shown in FIGS. 3 and 4, the retained member 21 is inserted into the groove 22 and is held inside the groove 22 by a retaining member 23 which is fixed to the deflector blade 14.

The retaining member 23 is made of sheet metal and has an L-shaped cross section. More specifically, the retaining member 23 includes an engaging part 24 having an upper end 24a or one end that engages with the retained member 21 inside the groove 22, and a fixing part 25 that is continuous to a lower end 24b or another end of the engaging part 24 and located outside the groove 22. The fixing part 25 extends from the lower end 24b of the engaging part 24 at an angle (90 degrees in this embodiment) with respect to the engaging part 24, and is fixed to the deflector blade 14. The engaging part 24 and the fixing part 25 both extend in the vehicle width direction. A plurality of through holes 26 are formed in the fixing part 25 at intervals along the vehicle width direction. The fixing part 25 is fixed to the deflector blade 14 by a plurality of screw members 27 inserted through the insertion holes 26. Each screw member 27 is a fastening member having a shaft portion 28 formed with a male thread and a head 29, and the shaft portion 28 thereof is inserted through the insertion hole 26 and screwed into a screw hole 30 formed in the deflector blade 14. Thereby, the fixing part 25 is fixed to the deflector blade 14 by the heads 29 of the screw members 27.

Since the retaining member 23 is fixed to the deflector blade 14 by the screw members 27 inserted into the insertion holes 26, the retaining member 23 is unlikely to be dislodged from the deflector blade 14. Further, since the retaining member 23 is made of metal and includes the engaging part 24 and the fixing part 25 at an angle with respect to the engaging part 24, it is resistant to bending. Therefore, the deflector main body 11 is prevented from coming loose.

The retained member 21 is folded back at the bottom of the groove 22 so as to have an inverted J-shape when viewed from a side. The retained member 21 is an extruded plastic product, and is made of a softer material than the deflector blade 14. The retained member 21 includes a base part 31 connected to the deflector main body 11, a tip part 32 opposing the base part 31, and a connecting part 33 connecting the base part 31 and the tip part 32 to each other. The connecting part 33 is located at the bottom of the groove 22 and forms a folded portion causing the tip part 32 to oppose the base part 31. The retained member 21 is received in the groove 22 with the engaging part 24 of the retaining member 23 interposed between the two parts of the retained member 21. The engaging part 24 of the retaining member 23 abuts against the folded portion of the retained member 21 located at the bottom of the groove 22 to be engaged thereby. By fixing the fixing part 25 to the deflector blade 14 with the screw members 27, the retained member 21 is held inside the groove 22 by the engaging part 24.

In this way, the retained member 21 is folded back at the bottom of the groove 22 and accommodated in the groove 22 with the engaging part 24 interposed between the two parts of the retained member 21, so that the retained member 21 can be kept engaged even if it is not bonded or otherwise connected to the engaging part 24. Therefore, the retained member 21 is prevented from being detached from the groove 22 of the deflector blade 14.

The tip part 32 of the retained member 21 is formed thinner than the base part 31 and the connecting part 33 thereof. A pair of lips 34 extending in the vehicle width direction are integrally formed on the surface of the tip part 32 facing the base part 31. A ridge 35 extending in the vehicle width direction is integrally formed on the surface of the base part 31 so as to oppose the tip part 32. The ridge 35 is positioned so as to correspond to the lips 34 and comes into contact with the front surface of the engaging part 24. The two lips 34 abut against the rear surface of the engaging part 24. More specifically, the lips 34 and the ridge 35 are formed on the base part 31 and the tip part 32 of the retained member 21, respectively, which sandwich the engaging part 24 therebetween so as to project toward the engaging part 24. Therefore, the two parts of the retained member 21 that interpose the engaging part 24 therebetween abut against the engaging part 24 over a long region extending along the lateral direction. This prevents any part of the deflector main body 11 from slackening due to displacement of the retained member 21 with respect to the engaging part 24.

Figure 5:
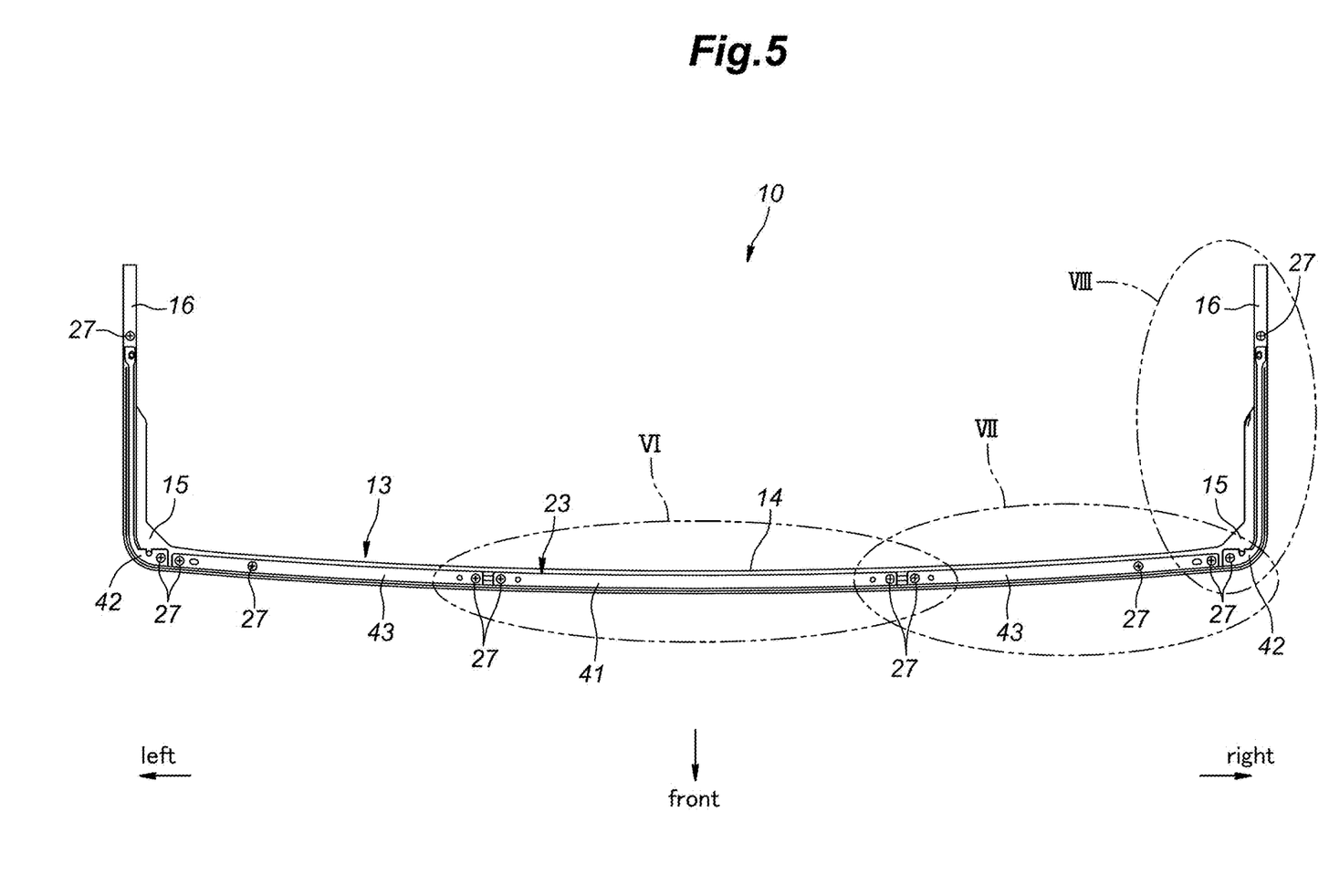
FIG. 5 A bottom view of an upper holder

FIG. 5 is a bottom view of the upper holder 13. As shown in FIG. 5, the retaining member 23 is divided into five parts in the lateral direction or the vehicle width direction. More specifically, the retaining member 23 includes a central member 41 positioned at the laterally central part of the deflector blade 14, a pair of curved members 42 positioned at the curved parts 15 of the deflector blade 14, respectively, and a pair of intermediate members 43 positioned between the central member 41 and the curved members 42, respectively. Each curved member 42 extends rearward from the curved part 15 and is attached to the corresponding arm 16. More specifically, each arm 16 is formed such that the groove 22 formed in the deflector blade 14 further extends through the curved part 15 and the arm 16. As shown in FIG. 2 also, each end portion of the retained member 21 extends in the fore and aft direction and is held within the groove 22 formed in the corresponding arm 16.

Figure 6:
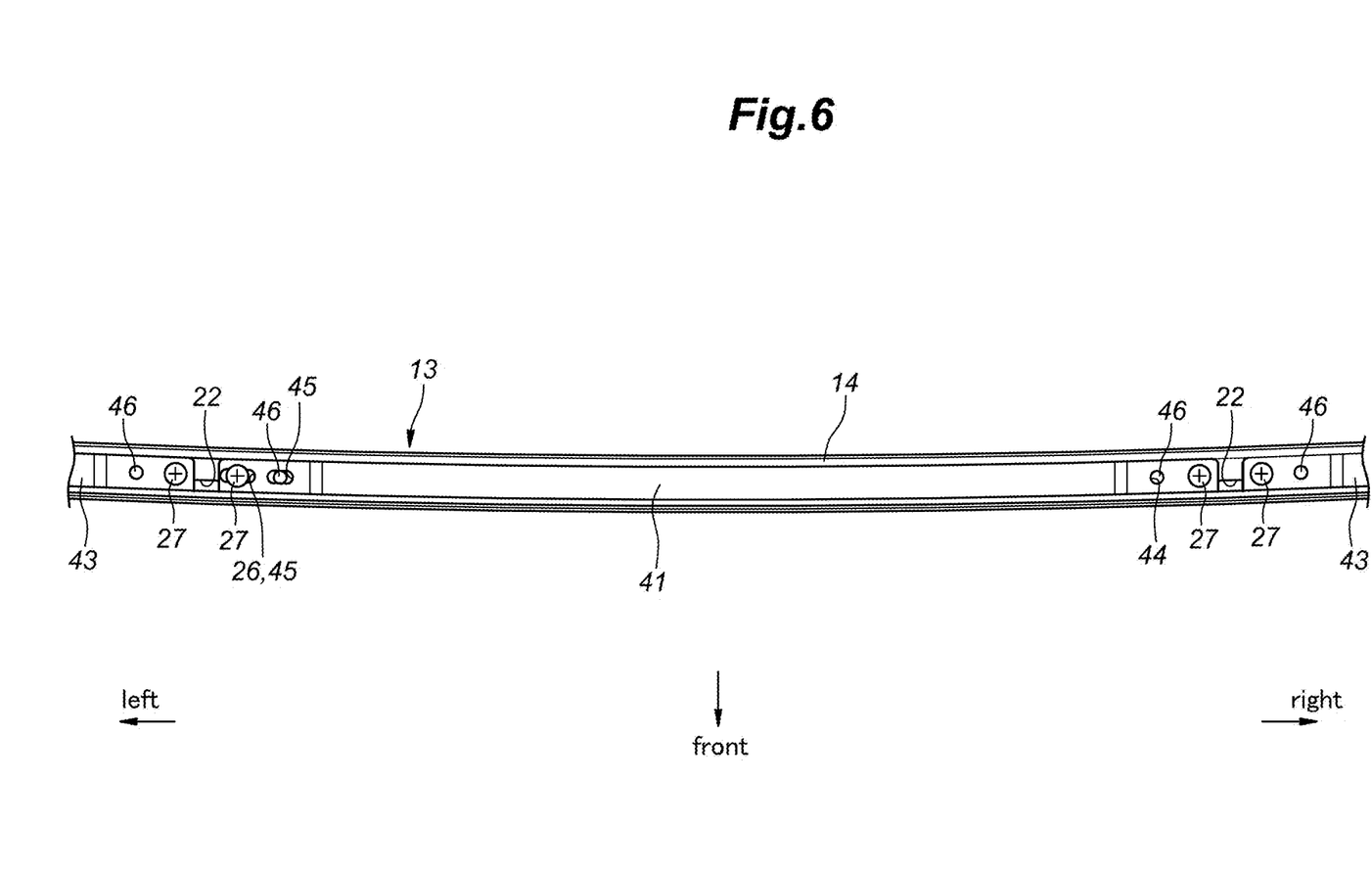
FIG. 6 An enlarged view of a part VI of FIG. 5

FIG. 6 is an enlarged view of the part VI of FIG. 5, showing the central member 41. As shown in FIG. 6, the right end of the central member 41 is provided with a pair of circular holes 44 serving as a positioning hole and an insertion hole 26 (FIG. 4) for the corresponding screw member 27 (one of the circular holes 44 is concealed by the screw member 27). At the left end of the central member 41, a pair of slots 45, which serve as an insertion hole 26 and a positioning hole, are formed. Circular projections 46 are formed in the parts of the upper holder 13 corresponding to the two positioning holes. The circular hole 44 and the slot 45 with which the projections 46 engage function as positioning holes for positioning the central member 41. A pair of screw hole 30 (FIG. 4) are formed in the parts of the upper holder 13 corresponding to the two insertion holes 26, and the central member 41 is fixed to the upper holder 13 by the screw members 27 that are threaded into the screw holes 30.

Figure 7:
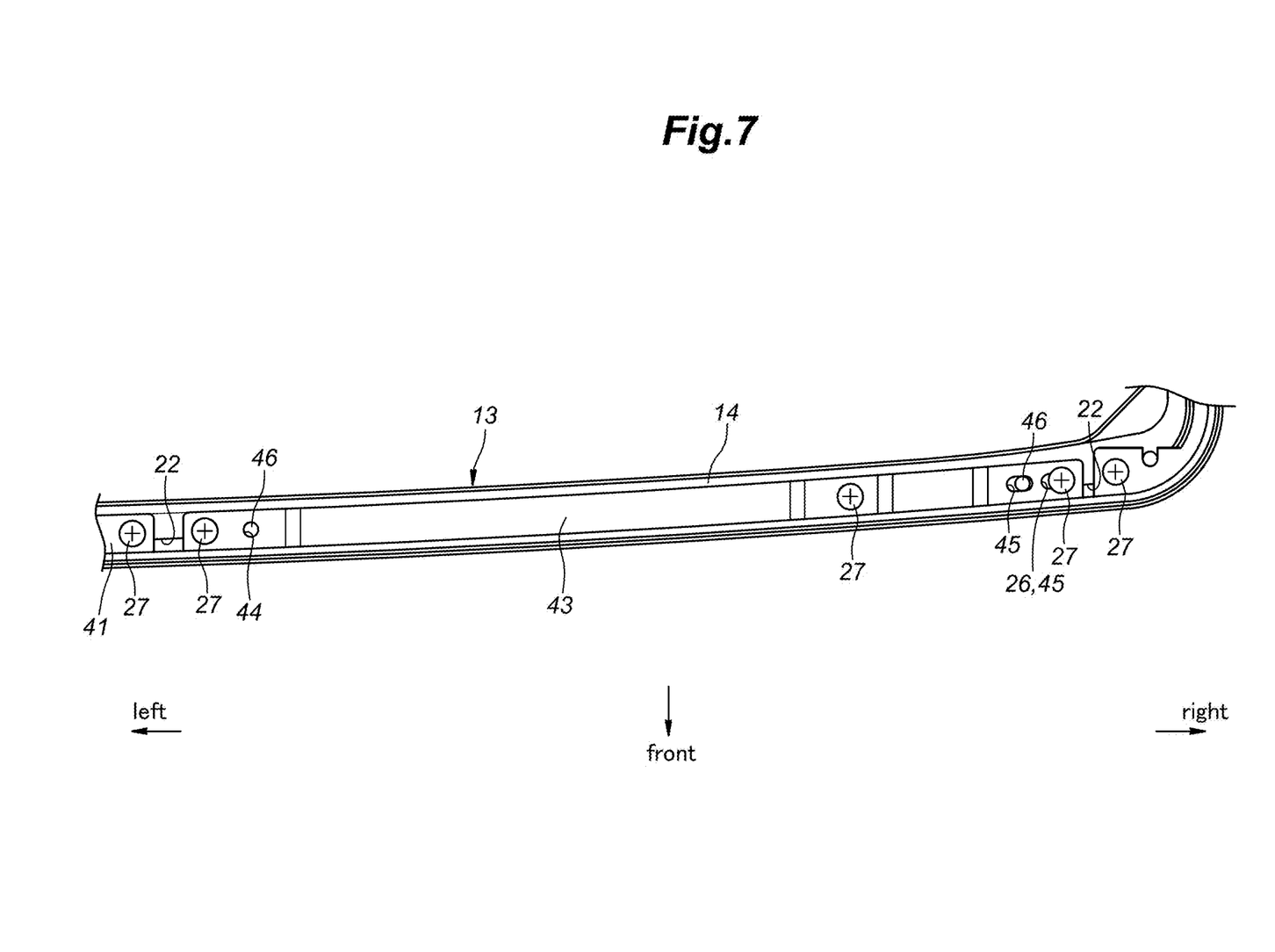
FIG. 7 An enlarged view of a part VII of FIG. 5

FIG. 7 is an enlarged view of the part VII of FIG. 5, showing the intermediate member 43 on the right side. As shown in FIG. 7, the intermediate member 43 is positioned so as to create a gap between the intermediate member 43 and the central member 41. At the left end of the intermediate member 43, a pair of circular holes 44 serving as an insertion hole for the corresponding screw member 27 (FIG.

4) and a positioning hole are formed (one of the circular holes 44 is concealed by the screw member 27). At the right end of the intermediate member 43, a pair of slots 45 serving as an insertion hole 26 for the corresponding screw member 27 and a positioning hole are formed. Another insertion hole 26 is formed in an intermediate position of the intermediate member 43 (concealed by the screw member 27). A pair of circular projections 46 are formed in the parts of the upper holder 13 corresponding to the two positioning holes. The parts of the upper holder 13 corresponding to the three insertion holes 26 are formed with screw holes 30 (FIG. 4), and the intermediate member 43 is fixed to the upper holder 13 by the screw members 27 that are threaded into the screw holes 30.

Figure 8:
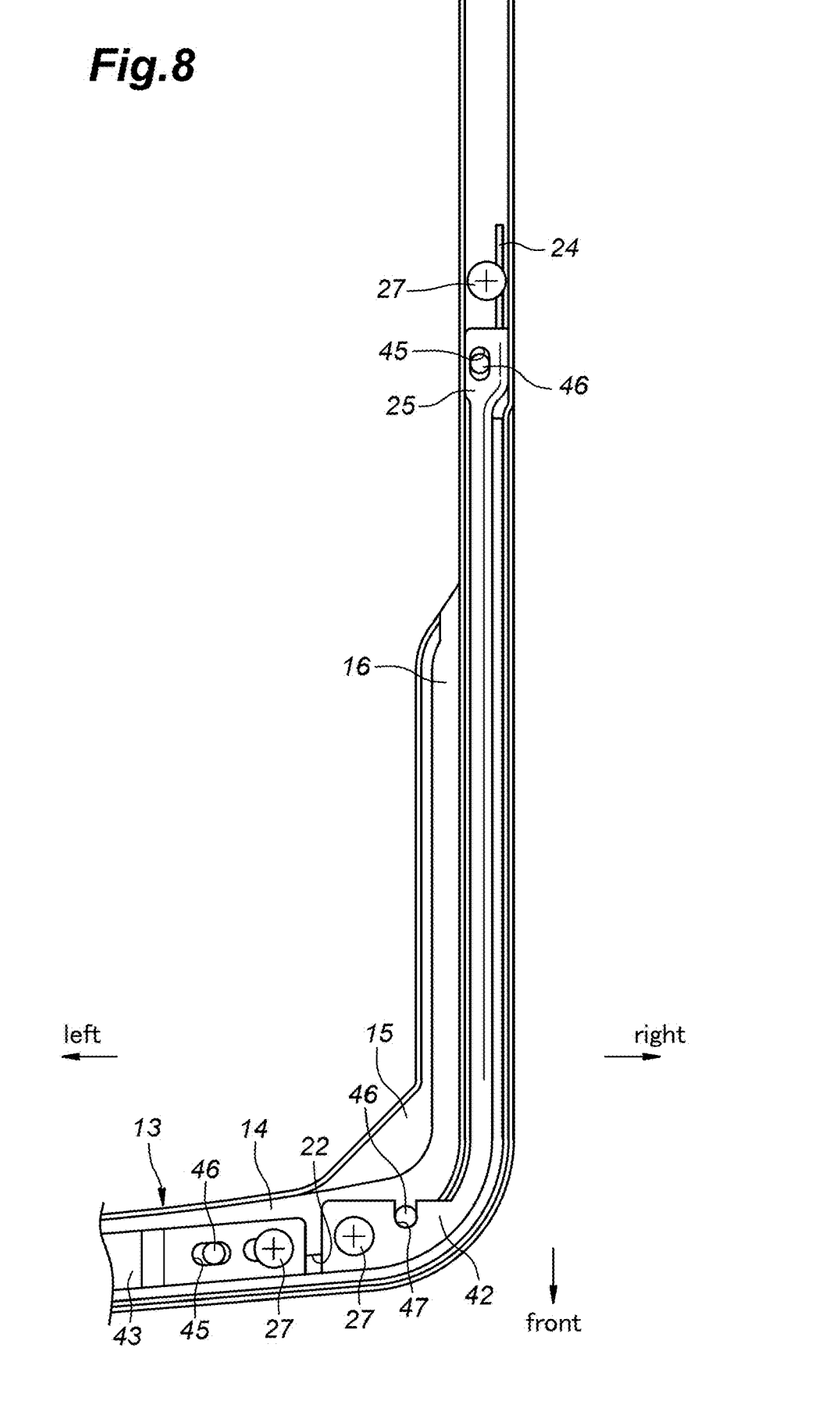
FIG. 8 An enlarged view of a part VIII of FIG. 5

FIG. 8 is an enlarged view of the part VIII of FIG. 5, showing the curved member 42 on the right side. As shown in FIG. 8, the curved member 42 is positioned so as to create a gap between the curved member 42 and the intermediate member 43. At the front end of the curved member 42, a circular hole 44 (concealed by the screw member 27) forming an insertion hole 26 for the corresponding screw member 27 and a notch 47 for positioning purpose are formed. The rear end of the curved member 42 is provided only with the engaging part 24 and does not have the fixing part 25. A slot 45 serving as a positioning hole is formed in a part of the fixing part 25 near the rear end of the curved member 42. A pair of circular projections 46 are formed in parts of the upper holder 13 corresponding to the notch 47 and the positioning hole. A screw hole 30 (FIG. 4) is formed at the front end of the curved member 42 at a part corresponding to the insertion hole 26 and another screw hole 30 is formed at the rear end of the curved member 42 on the laterally inner side of the engaging part 24. The curved member 42 is fixed to the upper holder 13 by the screw members 27 that are threaded into the screw holes 30. The screw member 27 located at the rear end of the curved member 42 locks the end surface of the engaging part 24 with the radially extending part of the head 29.

As shown in FIGS. 2 and 3, each curved member 42 is configured such that the end part of the retained member 21 is retained inside the groove 22 formed in the corresponding arm 16. Therefore, even if there is a manufacturing error in the dimensions of the upper holder 13 and the retaining member 23, the end of the retained member 21 can be retained in the groove 22 formed in the curved part 15 and the arm 16 of the holder 13 by the two curved members 42 so as to overcome the positioning error due to manufacturing error. As a result, slackening of the end portion of the deflector main body 11 is suppressed.

Furthermore, even if there is no manufacturing error since the upper holder 13 is made of plastic material and the retaining member 23 is made of metal, there is a possibility that the retaining member 23 may not fit into the groove 22 due to the difference in thermal expansion coefficient. In this embodiment, the retaining member 23 includes the central member 41 and the curved members 42, which define gaps relative to the adjoining intermediate members 43. Therefore, even if a dimensional difference occurs due to a difference in the coefficient of thermal expansion, the ends of the retained member 21 are retained in the groove 22 formed in the curved part 15 of the upper holder 13 and the arm 16 by the two curved members 42 so as to suppress positional errors.

As shown in FIGS. 5 to 8, in the central member 41, intermediate member 43, and curved member 42, the fixing part 25 extends along the length of the engaging part 24 in the lateral direction of the vehicle. In other words, the retaining member 23 has an L-shaped cross section in the part thereof extending in the vehicle width direction. Therefore, the bending rigidity of the retaining member 23 is improved over the entire length in the vehicle width direction. Thereby, the bending of the retaining member 23 is suppressed, and slackening of the deflector main body 11 is suppressed.

As described above, the projections 46 are provided in the deflector blade 14 near the screw holes 30 (FIG. 4) into which the screw members 27 are threaded, and the circular holes 44 and the slots 45 serving as the positioning holes for the projections 46 to engaged with are provided in the fixing part 25 of the retaining member 23. In other words, the retaining member 23 can be positioned with respect to the deflector blade 14 by the engagement between the projections 46 and the positioning holes. This facilitates the fitting of the screw members 27 into the deflector blade 14. Moreover, since the positioning holes includes the slots 45, it is possible to tolerate a dimensional error between the upper holder 13 and the retaining member 23 when assembling them.

The present invention has been described above in terms of a specific embodiment of the present invention, but is not limited by such an embodiment, and can be modified in a wide range of ways. For example, in the above embodiment, the deflector device 10 was applied to the roof 1 of an automobile as an example, but it can also be widely applied to other vehicles such as trailers and railway cars. Further, in the above embodiment, each arm 16 was directly urged upward by the biasing member 18, but the biasing member 18 may also indirectly bias the arm 16 to urge the deflector blade 14 upward. In addition, the specific configuration, arrangement, quantity, material, angle, etc. of each member or part can be changed as appropriate without departing from the scope of the present invention. Further, all of the constituent elements shown in the above embodiment are not necessarily essential to the present invention and can be selected as appropriate.

LIST OF REFERENCE NUMERALS

1: roof
2: opening
3: fixed roof
4: sunroof device
5: front panel
6: rear panel
10: deflector device
11: deflector main body
13: upper holder
14: deflector blade
15: curved part
16: arm
21: retained member
22: groove
23: retaining member
24: engaging part
24*a*: upper end (one end)
24*b*: lower end (other end)
25: fixing part
26: insertion hole
27: screw member (fastening member)
31: base part
32: tip part
33: connecting part
34: lip (projection)
35: ridge (projection)

41: central member
42: curved member
43: intermediate member
44: circular hole (insertion hole, positioning hole)
45: slot (insertion hole, positioning hole)
46: projection

The invention claimed is:

1. A deflector device for a vehicle sunroof, comprising:
a deflector main body made of cloth-like material so as to be folded and deployed and positioned along a front edge of an opening formed in a fixed roof;
a retained member provided along an upper edge of the deflector main body;
a deflector blade provided with a groove extending in a vehicle width direction to receive the retained member therein;
a pair of arms that support either lateral end of the deflector blade to allow the deflector blade to protrude and retract from and into the opening; and
a retaining member that is fixed to the deflector blade to retain the retained member in the groove,
wherein the retaining member includes an engaging part having one end that engages the retained member in the groove, and a fixing part extending from another end of the engaging part at an angle to the engaging part and provided with a plurality of insertion holes for a fastening member secured to the deflector blade.

2. The deflector device for a vehicle sunroof according to claim 1, wherein the retained member is received in the groove in a folded back state at the bottom of the groove so as to interpose the engaging part.

3. The deflector device for a vehicle sunroof according to claim 2, wherein parts of the retained member that interpose the engaging part are each provided with a protrusion protruding toward the engaging part.

4. The deflector device for a vehicle sunroof according to claim 1, wherein the fixing part extends in the vehicle width direction over a length corresponding to a length of the engaging part in the vehicle width direction, and the retaining member has an L-shape in a cross section orthogonal to the vehicle width direction.

5. The deflector device for a vehicle sunroof according to claim 1, wherein the deflector blade is provided with a projection adjacent to a part thereof to which the fastening member is attached, and the fixing part is provided with a positioning hole which engages the projection.

6. The deflector device for a vehicle sunroof according to claim 1, wherein the deflector blade is formed integrally with the arms so as to be continuous with the arms via a pair of curved parts thereof, and the retaining member includes a central member positioned at a center in the vehicle width direction and a pair of curved members positioned on the curved parts, respectively, and each curved member is configured to retain a corresponding end of the retained member in a part of the groove formed in the corresponding arm.

* * * * *